Dec. 26, 1950     F. A. GRUETJEN     2,535,917
PROPELLER BLADE WITH A TUBULAR BACKBONE
Filed Aug. 4, 1945     3 Sheets-Sheet 1
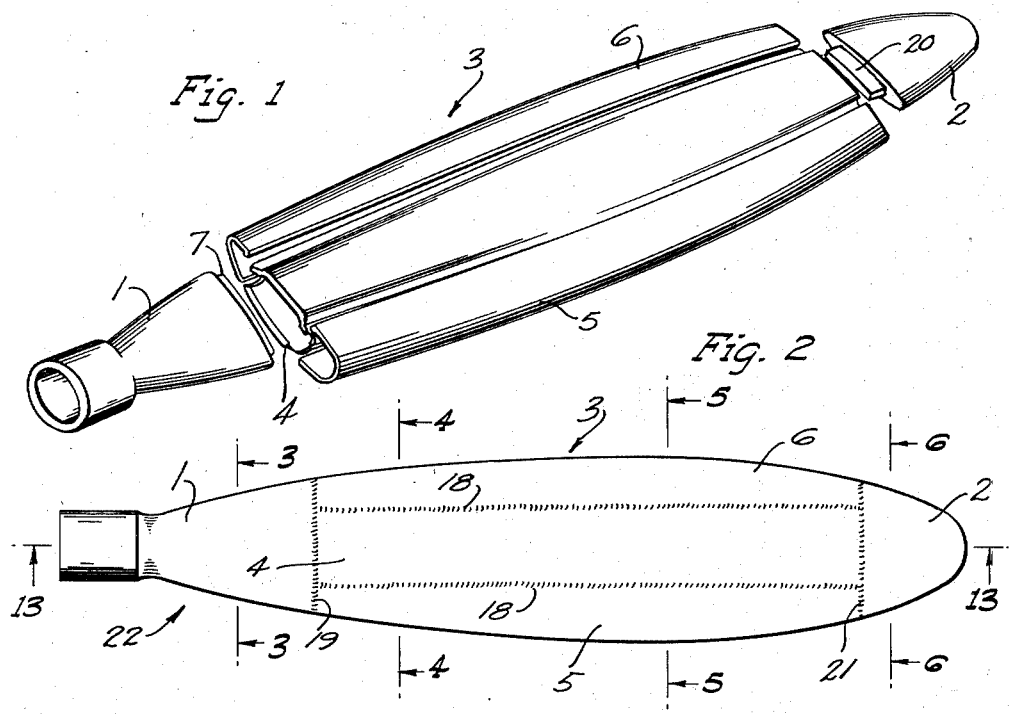
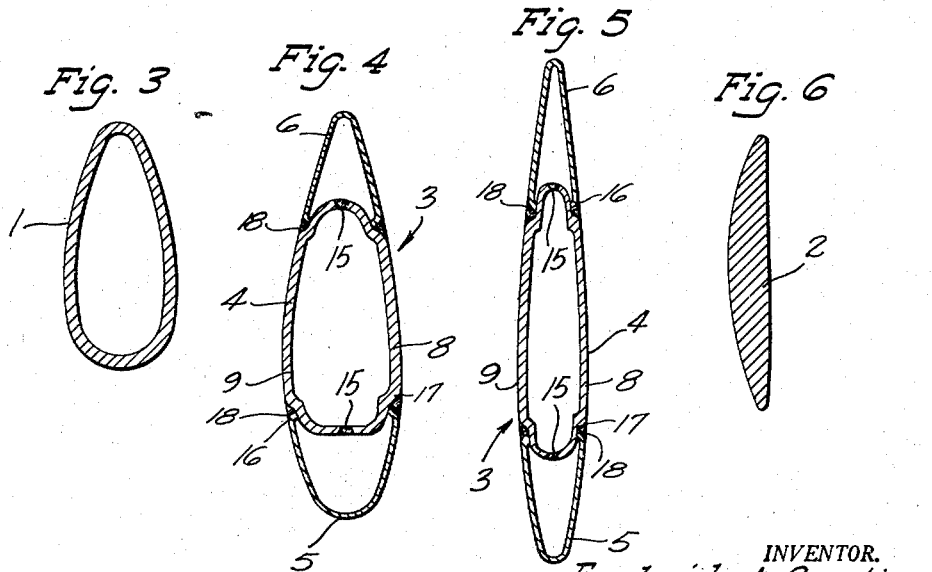
INVENTOR.
Frederick A. Gruetjen
BY
Attorney Dec. 26, 1950     F. A. GRUETJEN     2,535,917
PROPELLER BLADE WITH A TUBULAR BACKBONE
Filed Aug. 4, 1945     3 Sheets-Sheet 2
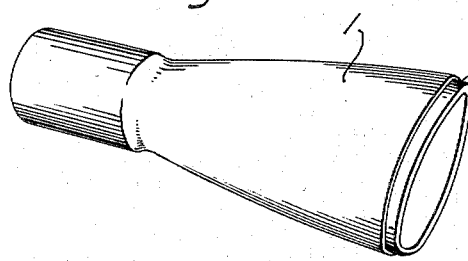
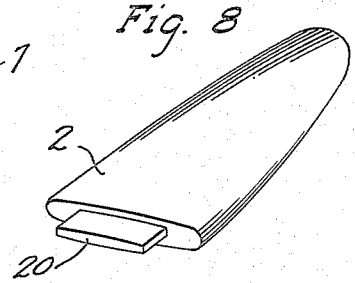
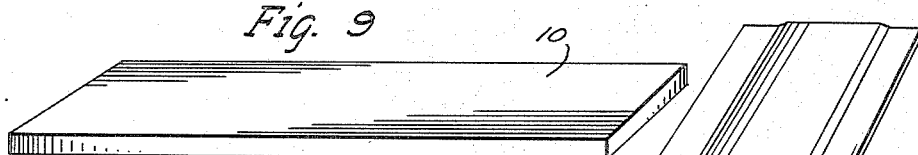
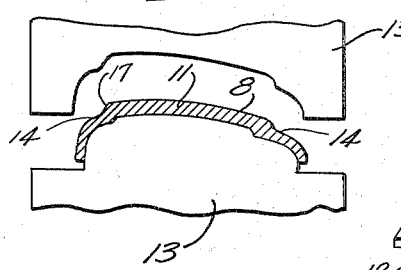
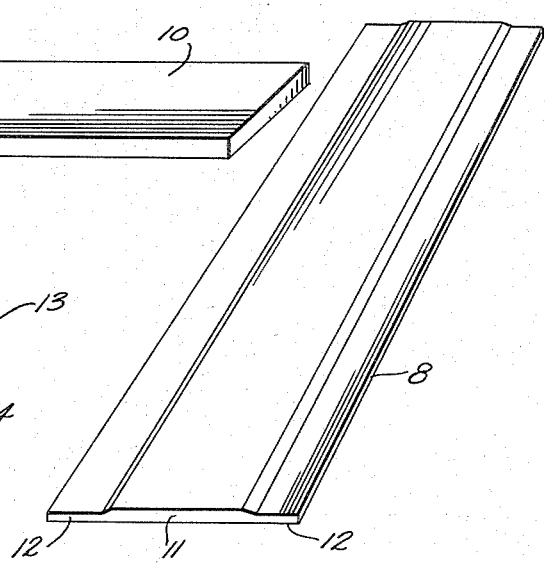
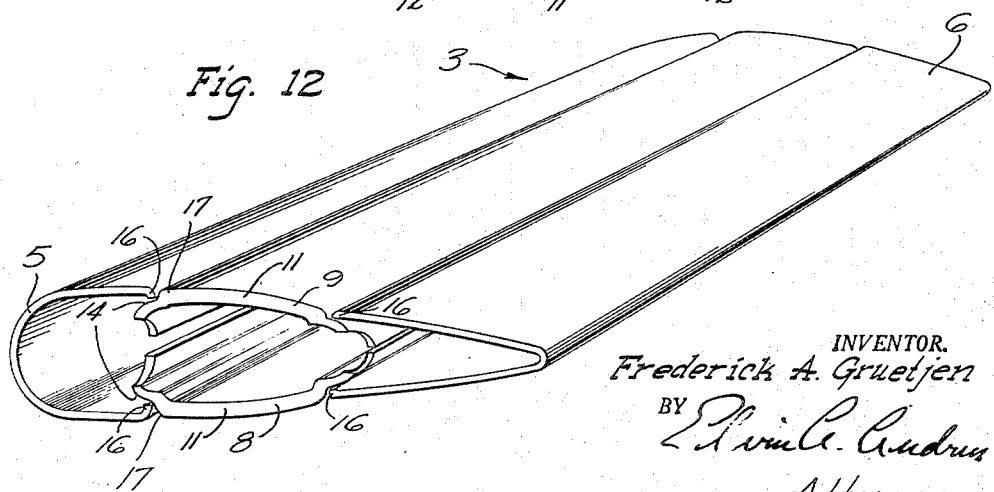
INVENTOR.
Frederick A. Gruetjen Dec. 26, 1950 F. A. GRUETJEN 2,535,917
PROPELLER BLADE WITH A TUBULAR BACKBONE
Filed Aug. 4, 1945 3 Sheets-Sheet 3
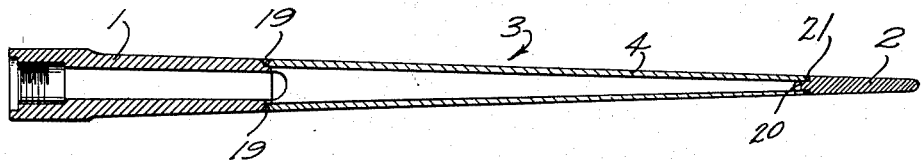
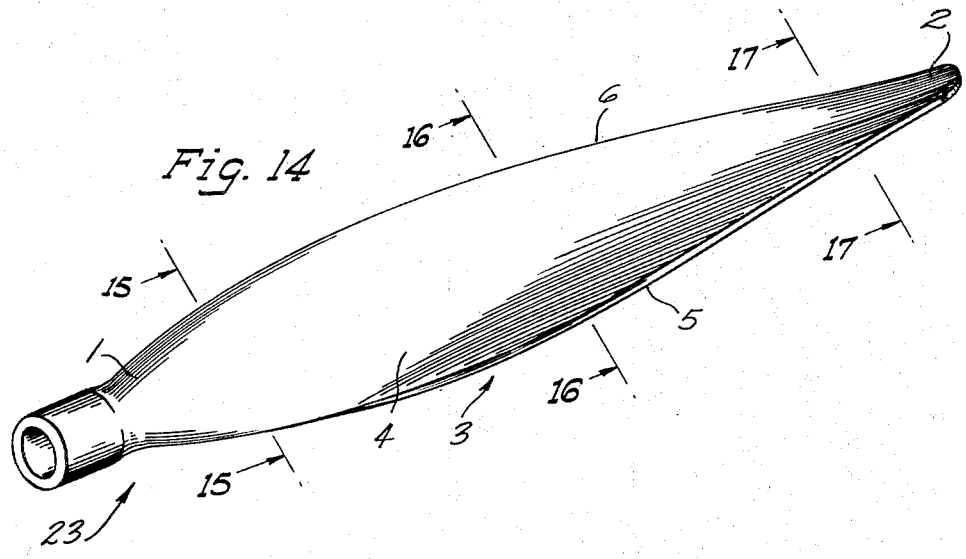
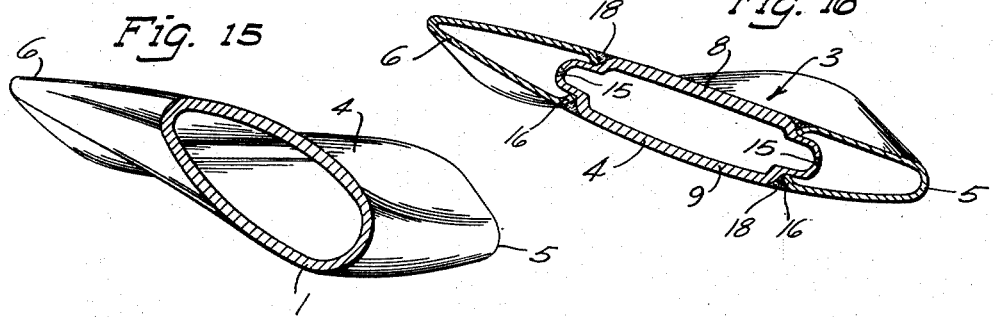
INVENTOR.
Frederick A. Gruetjen
BY
Attorney Patented Dec. 26, 1950

2,535,917

UNITED STATES PATENT OFFICE 2,535,917

PROPELLER BLADE WITH A TUBULAR BACKBONE

Frederick A. Gruetjen, Milwaukee, Wis., assignor to A. O. Smith Corporation, Milwaukee, Wis., a corporation of New York Application August 4, 1945, Serial No. 608,877

2 Claims. (Cl. 170—159)

This invention relates to a propeller blade with a tubular backbone and method of making the same, and constitutes an improvement upon the generally large blade, disclosed in the co-pending application of the present inventor, Serial No. 607,697, as applied to a smaller series of blades.

The principal object of the invention is to provide a propeller blade with a strong central tubular backbone manufactured without twist and disposed between the tip and shank section of the blade.

Another object is to provide an arc welded blade having a heavy backbone construction supporting light-weight leading and trailing edge members.

Another object is to provide a propeller blade with a plurality of parts that are fusion welded together and formed to the proper twist and contour thereafter.

Other objects and advantages of the invention will appear hereinafter.

The accompanying drawings illustrate the construction of propeller blades in accordance with the invention.

In the drawings:

Figure 1 is an isometric plan view of the parts of the blade prior to welding;

Fig. 2 is a plan view of the finished propeller blade;

Fig. 3 is a section taken on line 3—3 of Fig. 2;
Fig. 4 is a section taken on line 4—4 of Fig. 2;
Fig. 5 is a section taken on line 5—5 of Fig. 2;
Fig. 6 is a section taken on line 6—6 of Fig. 2;

Fig. 7 is a perspective view of the shank after it has been sized and machined to correspond in cross-section and shape to the central section of the blade;

Fig. 8 is a perspective view of a completed tip;

Fig. 9 is a perspective view of a blank from which a foil section is contour rolled and formed;

Fig. 10 is a similar view of a foil plate after contour rolling;

Fig. 11 is a similar view of the foil plate after the edges are curved to form the ribs of the blade and showing the dies for curving the same;

Figure 12 is an isometric view showing the forged parts of the central section prior to welding;

Fig. 13 is a longitudinal central section taken on line 13—13 of Fig. 2 after welding of the sections end to end;

Fig. 14 is a perspective view of the final twisted blade;

Figure 15 is a transverse section taken on line 15—15 of Fig. 14;

Fig. 16 is a similar section taken on line 16—16 of Fig. 14; and

Fig. 17 is a similar section taken on line 17—17 of Fig. 14.

The blade illustrated comprises a shank 1, a tip section 2, and a central section 3 which extends between the shank and tip section and comprises a tubular body section 4 to which is secured a leading edge member 5 and a trailing edge member 6.

The shank 1 is formed much in the same manner as the shank disclosed in the application of William C. Heath, Serial No. 480,682, from a seamless tube which is machined to taper the same longitudinally in thickness and flattened and sized to a symmetrical shape. The shank is provided with circumferential lip 7 at the outer blade end to facilitate welding thereof to the central section 3.

The tubular body section 4 of central section 3 has a generally rectangular shape adjacent the shank end of the blade and takes a flatter shape in the extent thereof to the tip of the blade. The body section 4 also tapers in wall thickness longitudinally to provide for progressively lighter weight therein at the tip end.

The tubular body section 4 is formed by welding together a thrust plate section 8 and a camber plate section 9 that have been suitably fabricated for assembly and welding together.

The foil plate sections 8 and 9 are complementary and similar. Plate sections 8, for example, as illustrated in Figs. 9, 10, 11 and 12 of the drawings is contour rolled from the blank 10 of flat plate stock shown in Fig. 9 to the shape illustrated in Fig. 10. The contour-rolling operation provides the plate section 8 with the generally thick central portion 11 that becomes a foil section of the blade and the relatively thinner longitudinal edge portions 12 which are curved inwardly relative to central portion by the dies 13 as shown in Fig. 11 to form longitudinal ribs within the completed blade.

The camber plate section 9 is contour rolled with the thick control portion 11 and generally thinner longitudinal edge portions 12 which are curved inwardly in the same manner as the edges 12 of section 8. When the foil sections 8 and 9 are assembled and welded together the thick portions 11 and the longitudinal edge portions or ribs 12 constitute the wall of the tubular section 4.

In contour rolling, the foil sections 8 and 9 are tapered longitudinally and the central portion 11 is provided with a greater thickness at the longitudinal edge portions than in the body.

In curving the edges 12, the dies 13 are operated in a maner to provide the horizontal seats 14 adjacent the thickened longitudinal edges of body section 11. The seats 14 extend the length of the tubular section 4 at each side of the central portions 11.

The edges 12 of the foil plate 8 and 9 curve inwardly with respect to body section 11 as described. When the plates 8 and 9 are assembled together corresponding edges of each plate are abutted and joined by the welds 15 to provide the tubular body section 4 with webs curved outwardly and formed from the relatively thin edge members 12.

The welds 15 are preferably fusion welds made by the atomic hydrogen process, or by arc or gas welding in which weld metal is deposited in the groove formed between the respective corresponding edges 12 when the edges of opposite foil plates are assembled together.

The leading edge member 5 is formed from generally thin sheet metal of uniform thickness and is curved into a blunt U-shaped cross-section. The trailing edge member 6 is similarly formed from the thin sheet metal of uniform thickness to a U-shaped cross-section. Both the edge members 5 and 6 are of the length of the tubular members 4 and of uniform thickness.

In the forming of members 5 and 6 the free edges 16 thereof are curved slightly inwardly to correspond with the taper of the longitudinal face of central portion 11 of tubular section 4. The edge members 5 and 6 are assembled with the tubular section 4 for welding thereto, the free edges 16 of the respective edge members resting on the corresponding seats 14 slightly removed from the shoulder 17 of the central portion 11 of the corresponding foil plate section 8 or 9 as the case may be. This provides a groove between the edge 16 and the shoulder 17 into which is deposited weld metal, preferably by the atomic hydrogen process, or by arc or gas welding to join the edge members 5 and 6 to the tubular section 4 along the longitudinal seams 18. The welding of the edge members 5 and 6 to the tubular body section 4 completes the central section 3 of the blade.

The central section 3 is joined to the shank 1 by the circumferential weld 19. The end of the central section 3 overlaps the lip 7 of the shank for a slight distance upon assembly together and the weld metal of the weld 19 is deposited in the grooves formed therebetween to join the shank and central section 3 together. The weld 19 is a fusion weld similar to welds 15 and 18.

The tip 2 may be formed from a solid metal blank forged to blade shape as illustrated in Fig. 8 and is provided with the lip or extension 20 on the inner end thereof.

The tip 2 is assembled with central section 3 with the lip 20 inserted in the end of member 4. Weld metal is deposited between the tip and the central section with the lip 20 forming a dam therefore, to join the tip and central section together at the transverse seam 21.

After the shank 1, central section 3 and tip 2 have been welded together, as described, into the blade blank 22, the welds are ground and the blade is subjected to a forming operation such as that described and claimed in the co-pending application of the present inventor above referred to. In this operation the blade is twisted and pressed to blade shape. When finally balanced and machined the final blade 23 appears as illustrated in Fig. 14.

The invention provides a propeller blade having a strong backbone in the central portion thereof that permits the blade to be twisted to blade shape after assembly without wrinkles or dents. The blade is of generally lighter weight for a given strength, than blades heretofore employed of comparable size.

Various embodiments of the invention may be employed within the scope of the accompanying claims.

I claim:

1. In a hollow metal propeller blade, a heavy weld fabricated tubular backbone section comprising complementary air foil plate-like members having generally thick body portions and thin edge portions constituting inwardly curved flanges and providing seats extending longitudinally on either side of said thicker body portions, welds joining said flanges together longitudinally internally of the blade to provide webs, a pair of generally U-shaped light sheet metal members having their free longitudinal edges curved inwardly and assembled on corresponding seats on said members, and weld metal joining said free edges of the sheet metal members to said backbone section to provide a continuous air foil shape for the blade, at least one of said welded webs being thin and of U-shape extending in the general direction of the corresponding U-shaped sheet metal member and with its walls spaced therefrom to provide for the twisting of the blade to shape after assembly and welding of the parts and without interference between the walls of the U-shaped web and of the corresponding U-shaped sheet metal member.

2. A hollow metal propeller blade comprising a heavy weld fabricated tubular section having complementary air foil plate-like members with thick body portions and thin edge portions constituting inwardly curved webs and providing seats extending longitudinally on either side of said thicker body portions, welds joining said webs together longitudinally internally of the blade to provide the same as longitudinal strengthening ribs, a pair of generally U-shaped light sheet metal members having their free longitudinal edges curved inwardly and assembled on corresponding seats on said members, weld metal joining said free edges of the sheet metal members to said tubular section to provide a continuous air foil shape for the blade, a shank welded to the inner end of said tubular section and edge members, and a tip welded to the outer end of the tubular section and edge members to complete the blade, said blade embodying the final pitch twist, and each of said welded webs being thin and of U-shape extending in the general direction of the corresponding U-shaped sheet metal member and with its walls spaced therefrom to provide for twisting of the blade to such final shape after assembly and welding of the parts and without interference between the walls of the U-shaped web and of the corresponding U-shaped sheet metal member.

FREDERICK A. GRUETJEN.

(References on following page)

REFERENCES CITED

The following references are of record in the file of this patent:

UNITED STATES PATENTS

| Number | Name | Date |
|---|---|---|
| 1,317,032 | Page | Sept. 23, 1919 |
| 1,831,365 | Reed | Nov. 10, 1931 |
| 1,996,850 | Bendix | Apr. 9, 1935 |
| 2,231,772 | Nelson | Feb. 11, 1941 |
| 2,262,163 | Brauchler | Nov. 11, 1941 |
| 2,370,136 | Berliner | Feb. 27, 1945 |
| 2,427,785 | Hoover | Sept. 23, 1947 |
| 2,457,889 | Gruetjen | Jan. 4, 1949 |

FOREIGN PATENTS

| Number | Country | Date |
|---|---|---|
| 231,919 | Great Britain | Apr. 7, 1925 |
| 314,462 | Germany | Sept. 19, 1919 |
| 369,478 | Great Britain | Mar. 24, 1932 |
| 417,232 | Great Britain | Oct. 1, 1934 |
| 541,759 | Great Britain | Dec. 10, 1941 |
| 546,176 | Great Britain | July 1, 1942 |
| 700,360 | Germany | Dec. 18, 1940 |

OTHER REFERENCES

Publication, Aviation News, June 19, 1944, page 31.